May 14, 1957 J. M. KOZLOVIC 2,792,462
LEVERING MECHANISM FOR METAL-CLAD SWITCHGEAR
Filed Aug. 12, 1955 3 Sheets-Sheet 1

WITNESSES

INVENTOR
John M. Kozlovic
BY
ATTORNEY

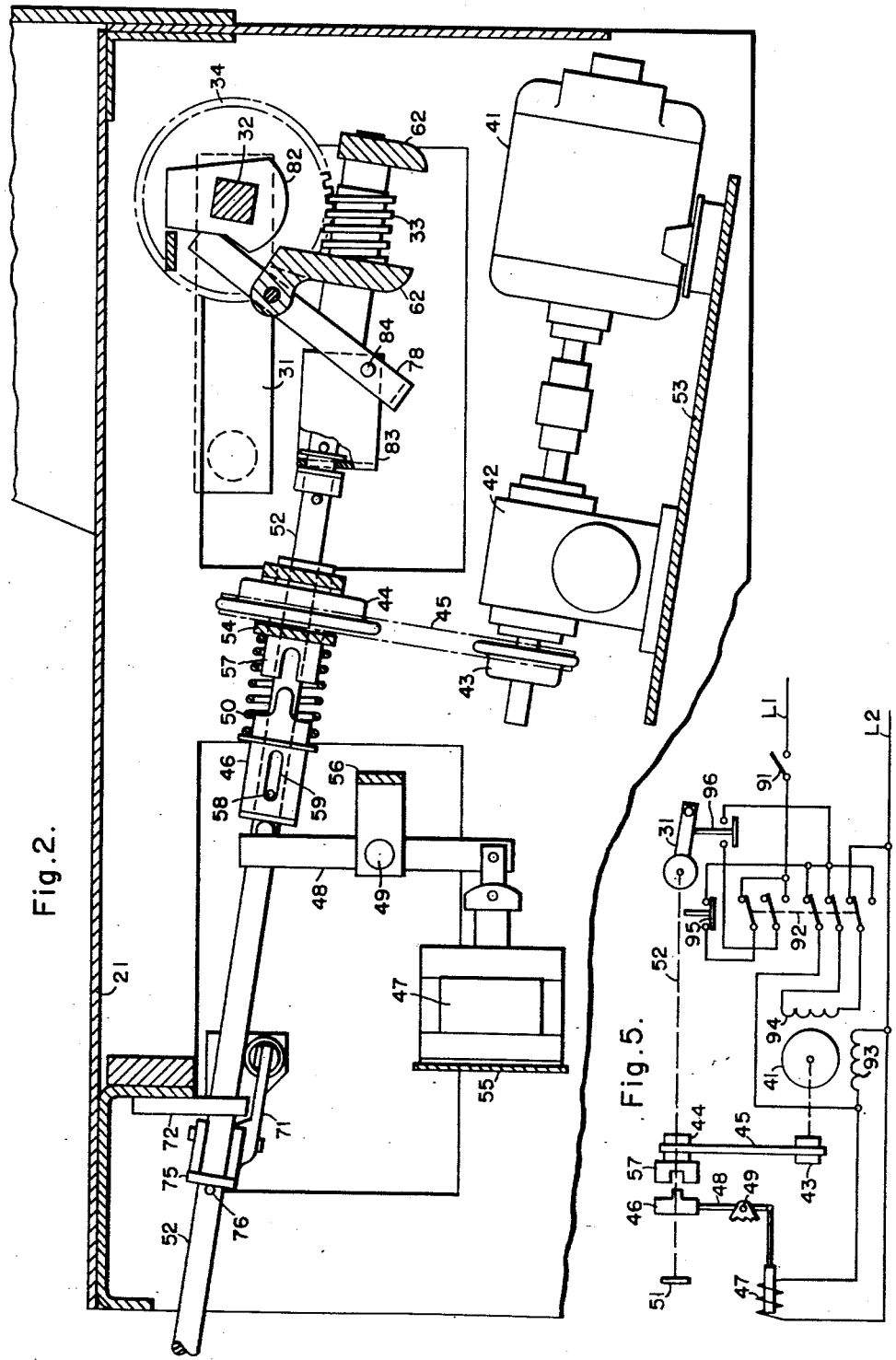

May 14, 1957  J. M. KOZLOVIC  2,792,462
LEVERING MECHANISM FOR METAL-CLAD SWITCHGEAR
Filed Aug. 12, 1955  3 Sheets-Sheet 3
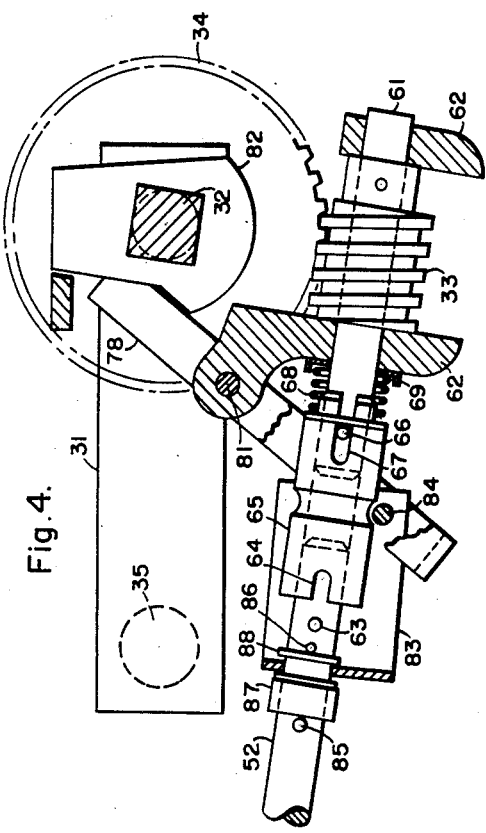
Fig. 4.
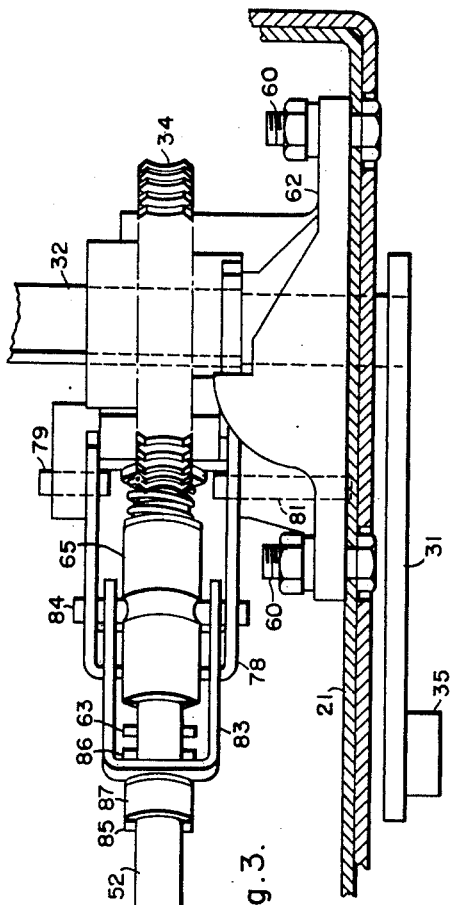
Fig. 3.
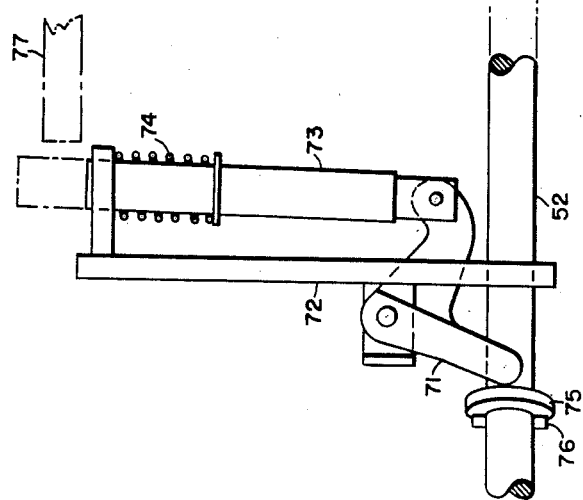

United States Patent Office 2,792,462
Patented May 14, 1957

2,792,462

LEVERING MECHANISM FOR METAL-CLAD SWITCHGEAR

John M. Kozlovic, Greensburg, Pa., assignor to Westinghouse Electric Corporation, East Pittsburgh, Pa., a corporation of Pennsylvania Application August 12, 1955, Serial No. 527,978

7 Claims. (Cl. 200—50)

My invention relates, generally, to metal-clad switchgear and, more particularly, to levering mechanisms for metal-clad switchgear having removable circuit breaker units.

An object of my invention, generally stated, is to provide an electrically operated levering mechanism which shall be simple and efficient in operation and which may be economically manufactured and installed.

A more specific object of my invention is to provide a levering mechanism which may be operated either manually or electrically.

A further object of my invention is to provide a combined interlocking and levering mechanism for a removable circuit breaker unit.

Other objects of my invention will be explained fully hereinafter or will be apparent to those skilled in the art.

In accordance with one embodiment of my invention, a levering device for moving a circuit breaker unit between connected and test positions in a switchgear cell may be manually operated by means of a crank which rotates a shaft, or the same shaft may be driven by an electric motor which is connected to the shaft through an electrically actuated clutch. Mechanical interlocking prevents operation of the levering device while the contact members of the circuit breaker are closed. The interlocking also prevents closing the breaker while it is at any position between the connected and the test positions.

For a better understanding of the nature and objects of the invention, reference may be had to the following detailed description, taken in conjunction with the accompanying drawings, in which:

Fig. 2 is an enlarged view, partly in side elevation and partly in section, of the interlocking mechanism and the levering device for moving the breaker unit in the cell between the connected and the test positions;

Fig. 3 is an enlarged view, partly in plan and partly in section of the interlocking mechanism and a portion of the levering device;

Fig. 4 is an enlarged view, partly in elevation and partly in section, of a portion of the structure shown in Fig. 3, and Fig. 5 is a diagrammatic view of a system for controlling the operation of the electrically operated levering device.

Figure 1:
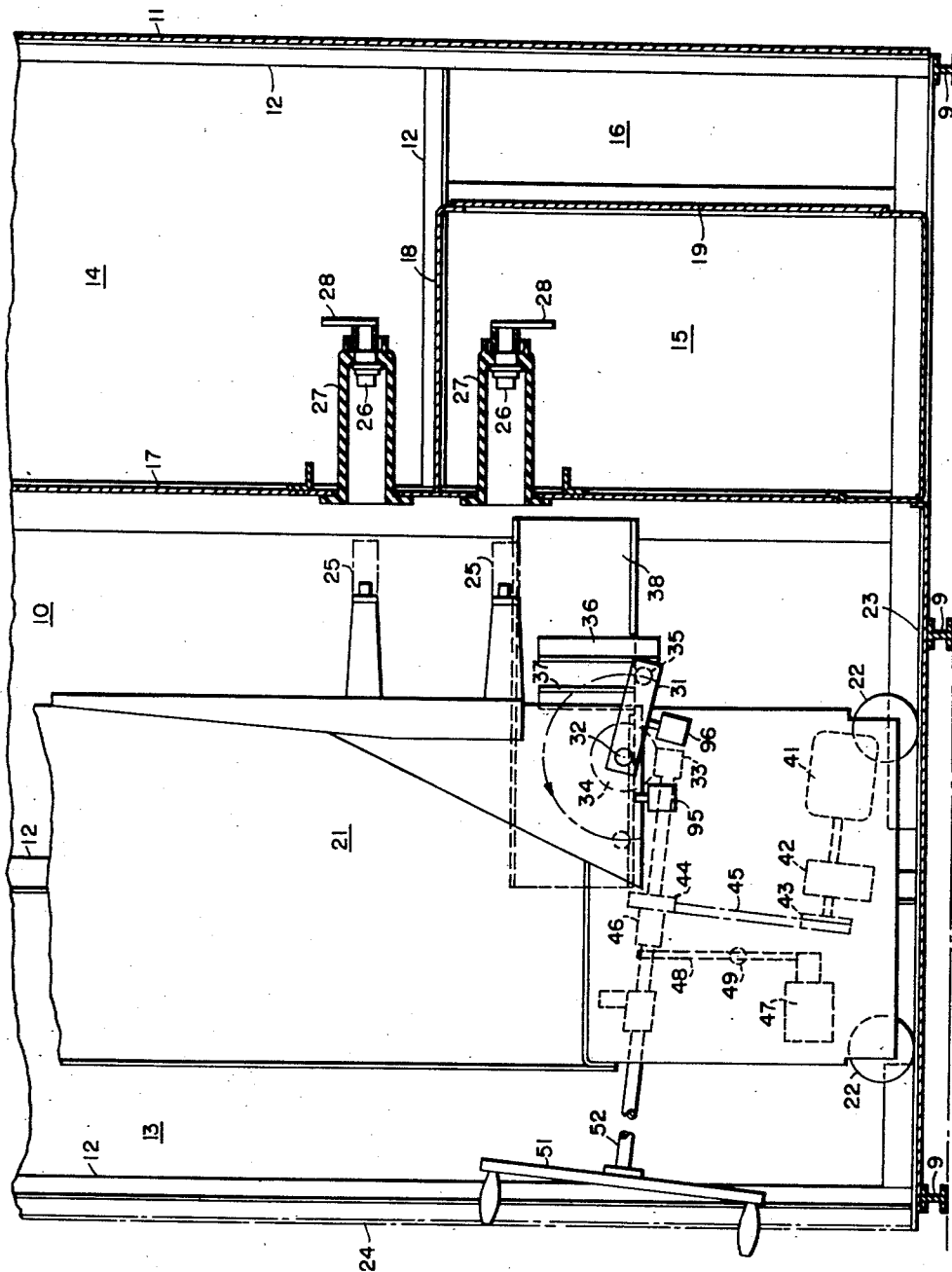
Figure 1 is a view, partly in side elevation and partly in section, of a portion of a metal-clad switchgear structure embodying the principal features of the invention.

Referring to the drawings, and particularly to Fig. 1, the structure shown therein comprises a portion of a metal-clad switchgear cell or housing 10 which may be constructed by securing sheet metal members 11 to angle frame members 12 in a manner well known in the art. The cell structure may rest upon beams 9 disposed upon a suitable foundation. The cell 10 comprises a circuit breaker compartment 13, a current transformer compartment 14, a bus compartment 15 and an outgoing cable compartment 16. The various compartments are separated by partition members 17, 18 and 19.

A circuit breaker unit 21 is disposed in the breaker compartment 13 and may be moved horizontally into and out of the cell on wheels 22 which run on rails 23 disposed at the bottom of the cell. A hinged door 24 is provided at the front of the cell to permit the breaker unit to be withdrawn from the cell. In accordance with the usual practice, the breaker unit is provided with primary disconnecting contact members 25 which are disposed to engage stationary contact members 26 which are mounted inside insulating sleeves 27 disposed inside the cell 10. The disconnecting contact members may be of the type described in Patent No. 2,376,818, issued May 22, 1945, to M. J. Rubel and assigned to the Westinghouse Electric Corporation.

In accordance with the usual practice, a levering device is provided for mechanically moving the circuit breaker unit 21 between the operating or connected position and the test or disconnected position within the cell 10. In the present drawing, the circuit breaker unit is shown in the test or disconnected position. When the breaker unit is inserted to the connected or operating position by means of the levering device, the disconnecting contact members 25 engage stationary contact members 26, thereby connecting the circuit breaker to power conductors 28 which are connected to the stationary contact members 26.

In the present instance, the levering device comprises a pair of lever arms 31 which are secured to a horizontal shaft 32 rotatably mounted in the circuit breaker unit. The shaft 32 is driven by a worm 33 and a worm gear 34 which is secured to the shaft 32. The worm 33 is driven in a manner which will be described more fully hereinafter.

A roller 35 is provided at the end of each one of the lever arms 31 and is disposed in a slot provided between angle members 36 and 37 which are secured to a channel member 38 which, in turn, is secured to angle frame members 12 at the side of the cell structure. Since a lever arm 31 and cooperating angle members 36 and 37 are provided at opposite sides of the breaker unit, a levering force is applied at both sides of the breaker unit.

It will be seen that when the shaft 32 is rotated to drive the arms 31 in a direction indicated by the arrow in Fig. 1, the rollers 35 move in the slots between the members 36 and 37 which, as previously explained, are secured to the sides of the cell structure, thereby drawing the circuit breaker unit into the cell to the connected position. When the shaft 32 is rotated in the opposite direction, force is applied through the arms 31 to move the breaker unit from the connected to the disconnected position shown in the drawing. As indicated by the broken lines, each roller 35 moves through an angle slightly over 180° during the movement of the breaker unit from the test to the connected position.

As explained hereinbefore, it is advantageous to operate the levering device by means of an electric motor, thereby reducing the manual labor and the time required to move the breaker unit into the cell. Also, the operation of an electric motor may be controlled from a remote location. However, it is desirable to be able to operate the levering device manually in case of failure of the power source for operating the electric motor drive. Thus, I have provided for operating the levering device by means of an electric drive comprising a motor 41, a reduction gear unit 42, sprocket wheels 43 and 44 connected by chain 45 and an electrically actuated clutch 46. The clutch 46 is actuated in one direction by a solenoid device 47 through a lever 48 which is pivoted at 49. The clutch 46 is biased in the opposite direction by a spring 50. The levering device may also be operated manually by means of a crank 51 connected to a shaft 52.

As shown most clearly in Fig. 2, the motor 41 and the reduction gear unit 42 are mounted on a bracket 53 which is attached to the breaker unit 21. The sprocket wheel 44 is mounted in a U-shaped bracket 54 also attached to the breaker unit 21. Likewise, the solenoid 47 is supported by a bracket 55 attached to the breaker unit 21. The lever 48 is supported by a bracket 56 also attached to the breaker unit 21. The fulcrum point 49 for the lever 48 is located on the bracket 56.

The sprocket wheel 44 is secured to a sleeve 57 which is rotatably mounted on the shaft 52, thereby permitting the shaft 52 to move longitudinally through the sleeve 57. The clutch member 46 is slidably disposed on the shaft 52, but a pin 58, which extends through the member 46, causes the shaft 52 to rotate with the clutch member 46 when the clutch is in engagement with the sleeve 57. A slot 59 in the member 46 permits longitudinal movement between the member 46 and the shaft 52.

As shown most clearly in Figs. 3 and 4, the worm 33 is secured to a stub shaft 61 which is rotatably mounted in a bracket 62 attached to the side of the breaker unit 21 by bolts 60. The stub shaft 61 may be connected to the shaft 52 when the shaft 52 is moved longitudinally to cause a pin 63 to enter a slot 64 in one end of a coupling sleeve 65. The other end of the coupling sleeve 65 is connected to the stub shaft 61 by means of a pin 66 disposed in a slot 67 in the sleeve 65. A spring 68 disposed between one end of the coupling sleeve 65 and a portion of the bracket 62 permits longitudinal movement of the sleeve 65 on the stub shaft 61. However, the pin 66 is always disposed in the slot 67 to connect the coupling sleeve 65 to the stub shaft 61. A cup-shaped washer 69 is provided between one end of the spring 68 and the bracket 62.

As explained hereinbefore, it is desirable to provide an interlocking mechanism to prevent operation of the levering device while the contact members of the circuit breaker are closed. The interlocking mechanism utilized in the present structure comprises a bell crank lever 71 which is pivotally mounted on a bracket 72 which is attached to the frame structure of the breaker unit 21. One arm of the bell crank lever 71 is connected to an interlocking bar 73 which is slidably disposed in a portion of the bracket 72. A spring 74 is disposed on the bar 73 to bias the bell crank lever 71 clockwise, as shown in Fig. 3. Thus, the bell crank lever 71 biases the shaft 52 to the left, as shown in Figs. 2 and 3. A washer 75 is provided between the end of the bell crank lever 71 and a pin 76 which extends through the shaft 52.

As previously explained, it is necessary to move the shaft 52 longitudinally to the right in order to connect the shaft 52 to the stub shaft 61 through the coupling member 65 to operate the levering device. When the contact members of the circuit breaker are opened, the shaft 52 is free to move longitudinally to the right as shown in Fig. 3. However, when the contact members of the circuit breaker are closed, a member 77 which is connected to the circuit breaker mechanism is moved to the left, as shown in Fig. 3, to interfere with the movement of the interlocking bar 73 and the bell crank lever 71. Thus, the shaft 52 is prevented from moving longitudinally and the levering device cannot be operated to move the circuit breaker unit between the test and the connected positions.

Furthermore, when the shaft 52 is moved longitudinally to the right, as shown in Fig. 3, the interlocking bar 73 moves to the position indicated by the broken lines to prevent closing the contact members of the circuit breaker while the breaker unit is being moved between the test and the connected positions. Also, a generally U-shaped lever 78, which is pivotally mounted on pins 79 and 81 in the bracket 62, is actuated by a cam 82 to prevent the shaft 52 from moving to the left while the breaker unit is at any position between the connected and the test positions in the cell. As shown in Figs. 3 and 4, the lever 78 is connected to a U-shaped member 83 by means of a pin 84. The shaft 52 extends through the base of the member 83. Pins 85 and 86 extend through the shaft 52 on opposite sides of the base of the member 83. Washers 87 and 88 may be provided between the member 83 and the pins 85 and 86.

In this manner the cam 82 actuates the lever 78 which, in turn, prevents the shaft 52 from moving to the left while the circuit breaker unit is at any position between the test and the connected positions. Thus, the interlocking bar 73 cannot move to a position to clear the member 77 to permit closing the contact members of the circuit breaker unit. It will be noted that the arm 31 in Figs. 3 and 4 is shown in the position in which the circuit breaker unit is fully inserted into the connected position in the cell. Thus, the lever 78 is disengaged from the cam 82 and the shaft 52 is moved to its furthermost position to the left.

The operation of the driving mechanism may be understood by referring to Fig. 5. Assuming that it is desired to operate the levering device to move the circuit breaker unit from the test to the connected position, a switch 91 may be closed to connect the motor 41 and the solenoid 47 to power conductors L1 and L2. It is assumed that a reversing switch 92 is in the proper position to cause the motor 41 to operate in the proper direction for moving the breaker unit from the test to the connected position. When the switch 91 is closed, a winding 93 of the motor 41 and the solenoid coil 47 are energized simultaneously through the contact members of a limit switch 95 and the reversing switch 92. A winding 94 of the motor 41 is also energized through the contact members of the limit switch 95 and the reversing switch 92. Thus, the motor 41 drives the sleeve 57 and the solenoid 47 actuates the clutch member 46 into engagement with the sleeve 57, thereby moving the shaft 52 longitudinally to cause the shaft to drive the worm gear 33 and operate the levering device in the manner previously explained.

It is assumed that the contact members of the circuit breaker are open so that the interlocking mechanism will permit longitudinal movement of the shaft 52. In case the contact members of the breaker are closed, the solenoid mechanism cannot move the shaft 52 longitudinally and the sleeve 57 merely rotates freely on the shaft 52.

When the breaker unit is moved to the connected position, the arm 31 of the levering device opens the limit switch 95, thereby deenergizing the motor 41 and the solenoid 47.

If it is desired to operate the motor drive to move the breaker unit from the connected to the test or disconnected position, the same procedure is followed with the exception that the reversing switch 92 must be operated to a position to cause the motor 41 to rotate in the opposite direction. When the switch 91 is closed, the circuits to the motor and the solenoid are established through a limit switch 96 which was permitted to close during operation of the levering device to move the breaker into the cell. The limit switch 96 functions to disconnect the motor and the solenoid when the breaker unit is moved to the test position. As previously explained, it is necessary for the contact members of the circuit breaker to be opened to permit operation of the levering device. Otherwise, the clutch 46 cannot engage the sleeve 57 to cause rotation of the shaft 52.

In case it is desired to operate the levering device manually, the crank 51 is placed on the end of the shaft 52 and the shaft 52 is moved longitudinally to the right to engage the pin 63 with the coupling member 65 in the manner previously explained. Longitudinal movement of the shaft through the clutch member 46 is permitted by the pin 58 moving in the slot 59. The spring 50 prevents the clutch 46 from engaging the sleeve 57. It is, of course, necessary for the contact members of the circuit breaker to be opened to permit longitudinal movement of the shaft 52. Otherwise, the interlocking mechanism will prevent the longitudinal movement of the shaft. After the shaft 52 has been moved longitudinally, it may be rotated by the crank 51 to operate the levering device to move the circuit breaker unit in the desired direction.

From the foregoing description, it is apparent that I have provided for operating a levering device either manually or electrically by means of a shaft which is utilized for both operations. Furthermore, the same mechanical interlocking mechanism controls both operations. Thus, a considerable saving is effected in the amount of equipment required to perform both operations.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a switchgear structure, in combination, a cell, a circuit breaker unit having openable and closable contact members disposed in the cell, a levering device for moving the breaker unit between connected and test positions in the cell, a manually rotatable shaft for operating the levering device, a motor mounted on the breaker unit, an electrically actuated clutch for connecting the motor to the shaft to rotate the shaft and operate the levering device, and mechanical interlocking means actuated by said levering device for preventing closing the contact members of the circuit breaker when the breaker unit is at any position between the connected and the test positions.

2. In a switchgear structure, in combination, a cell, a circuit breaker unit having openable and closable contact members disposed in the cell, a levering device for moving the breaker unit between connected and test positions in the cell, a manually rotatable shaft for operating the levering device, a motor mounted on the breaker unit, an electrically actuated clutch for connecting the motor to the shaft to rotate the shaft and operate the levering device, said clutch being energized simultaneously with said motor, and mechanical interlocking means for preventing closing the contact members of the circuit breaker when the breaker unit is at any position between the connected and the test positions.

3. In a switchgear structure, in combination, a cell, a circuit breaker unit having openable and closable contact members disposed in the cell, a levering device for moving the breaker unit between connected and test positions in the cell, a manually rotatable shaft for operating the levering device, a motor mounted on the breaker unit, an electrically actuated clutch for connecting the motor to the shaft to rotate the shaft and operate the levering device, mechanical interlocking means for preventing operation of said clutch when the contact members of the circuit breaker are closed, and additional mechanical interlocking means for preventing closing the contact members of the circuit breaker when the breaker unit is at any position between the connected and the test positions.

4. In a switchgear structure, in combination, a cell, a circuit breaker unit having openable and closable contact members disposed in the cell, a levering device for moving the breaker unit between connected and test positions in the cell, a manually rotatable shaft for operating the levering device, said shaft being manually movable longitudinally to connect to the levering device, a motor mounted on the breaker unit, and electrically operated means for also moving the same shaft longitudinally to connect the motor to the shaft to rotate the shaft and operate the levering device.

5. In a switchgear structure, in combination, a cell, a circuit breaker unit having openable and closable contact members disposed in the cell, a levering device for moving the breaker unit between connected and test positions in the cell, a manually rotatable shaft for operating the levering device, said shaft being manually movable longitudinally to connect to the levering device, a motor mounted on the breaker unit, and electrically operated means for also moving the same shaft longitudinally to connect the motor to the shaft to rotate the shaft and operate the levering device, said electrically operated means being energized simultaneously with said motor.

6. In a switchgear structure, in combination, a cell, a circuit breaker unit having openable and closable contact members disposed in the cell, a levering device for moving the breaker unit between connected and test positions in the cell, a manually rotatable shaft for operating the levering device, said shaft being manually movable longitudinally to connect to the levering device, a motor mounted on the breaker unit, electrically operated means for also moving the same shaft longitudinally to connect the motor to the shaft to rotate the shaft and operate the levering device, and mechanical interlocking means for preventing longitudinal movement of the shaft to operate the levering device when the contact members of the circuit breaker are closed.

7. In a switchgear structure, in combination, a cell, a circuit breaker unit having openable and closable contact members disposed in the cell, a levering device for moving the breaker unit between connected and test positions in the cell, a manually rotatable shaft for operating the levering device, said shaft being manually movable longitudinally to connect to the levering device, a motor mounted on the breaker unit, electrically operated means for also moving the same shaft longitudinally to connect the motor to the shaft to rotate the shaft and operate the levering device, mechanical interlocking means for preventing longitudinal movement of the shaft to operate the levering device when the contact members of the circuit breaker are closed, and additional mechanical interlocking means for preventing closing the contact members of the circuit breaker when the breaker unit is at any position between the connected and the test positions.

References Cited in the file of this patent

UNITED STATES PATENTS

| | | |
|---|---|---|
| 2,273,002 | Mahoney | Feb. 10, 1942 |
| 2,353,518 | Specht | July 11, 1944 |